United States Patent [19]

Perkins et al.

[11] Patent Number: 5,650,103
[45] Date of Patent: *Jul. 22, 1997

[54] INCREASED EFFICIENCY METHOD FOR LINING A PIPE WITH A CEMENT MORTAR

[75] Inventors: Alfred G. Perkins, McCormick, S.C.; Craig R. Perkins, Aurora, N.Y.

[73] Assignee: Mainlining Service, Inc., Elma, N.Y.

[*] Notice: The term of this patent shall not extend beyond the expiration date of Pat. No. 5,246,641.

[21] Appl. No.: 469,686

[22] Filed: Jun. 6, 1995

Related U.S. Application Data

[60] Division of Ser. No. 122,997, Sep. 17, 1993, Pat. No. 5,443,377, which is a continuation-in-part of Ser. No. 792,138, Nov. 13, 1991, Pat. No. 5,246,641.

[51] Int. Cl.$^6$ .................. B32B 35/00; C04B 40/00; E04B 1/16
[52] U.S. Cl. .................. 264/35; 138/97; 156/94; 264/36; 264/82; 264/232; 264/233; 264/269; 264/DIG. 43; 405/154; 427/142; 427/236; 427/397.8; 427/427
[58] Field of Search .................. 425/11, 13, 135, 425/169, 262, 404, 445, 460, 815, 469; 118/58, 64, 65, 68, 105, 712, 713, DIG. 10; 73/729.1; 264/82, 233, 333, DIG. 43, 309, 312, 269, 270, 340, 232, 31–36; 138/97, 98; 156/94; 405/154, 150.2; 427/427, 236, 140, 142, 372.2, 397.7, 397.8

[56] References Cited

U.S. PATENT DOCUMENTS

| | | | |
|---|---|---|---|
| 825,088 | 7/1906 | Thom | 264/82 |
| 898,703 | 9/1908 | Thom | 264/82 |
| 1,932,150 | 10/1933 | Tada | 264/82 |
| 1,988,329 | 1/1935 | Perkins | 25/38 |
| 2,168,917 | 8/1939 | Perkins | 25/38 |
| 2,363,226 | 11/1944 | Brund | 264/82 |
| 2,704,873 | 3/1955 | Kirwan et al. | 25/38 |
| 2,758,352 | 8/1956 | Perkins | 25/38 |
| 2,917,778 | 12/1959 | Lyon, Jr. et al. | 264/82 |
| 3,044,136 | 7/1962 | Perkins | 25/38 |
| 3,108,012 | 10/1963 | Curtis | 118/105 |
| 3,249,665 | 5/1966 | Bearden et al. | 264/270 |
| 3,358,342 | 12/1967 | Spence | 264/82 |
| 3,595,085 | 7/1971 | Harrah | 73/729.1 |
| 3,766,834 | 10/1973 | Kraemer | 73/729.1 |
| 4,067,680 | 1/1978 | Perkins | 425/460 |
| 4,093,690 | 6/1978 | Murray | 264/82 |
| 4,184,830 | 1/1980 | Perkins | 425/262 |
| 4,252,763 | 2/1981 | Padgett | 264/133 |
| 4,266,921 | 5/1981 | Murray | 425/815 |

(List continued on next page.)

FOREIGN PATENT DOCUMENTS

| | | |
|---|---|---|
| 53-114823 | 10/1978 | Japan . |
| 2022470 | 12/1979 | United Kingdom . |
| 2176867 | 1/1987 | United Kingdom . |

*Primary Examiner*—Karen Aftergut
*Attorney, Agent, or Firm*—Hodgson, Russ, Andrews, Woods & Goodyear, LLP

[57] ABSTRACT

An increased efficiency method and apparatus for lining a section of pipe with a cement mortar. After a wet cement mortar has been applied to a cleaned interior surface of a pipe, carbon dioxide is introduced into the freshly lined section of the pipe in such quantity that a crust of calcium carbonate will be formed on the interior surface of the wet cement mortar lining as the carbon dioxide reacts with calcium compounds of the wet cement mortar in a relatively short period of time. This crust is provided to protect the underlying mortar from scouring, while tolerating a low-velocity flow of water, until the normal hardening of the underlying mortar through hydration can take place so as to substantially reduce the out-of-service time of the section of pipe which is being lined. In order to provide a saturated carbon dioxide gas condition within the water main section for effective and rapid formation of the crust but with a minimum waste of carbon dioxide gas, the carbon dioxide gas pressure is regulated to maintain a positive pressure just slightly greater than atmospheric, bellows preferably provided to precisely indicate pressure.

7 Claims, 2 Drawing Sheets

U.S. PATENT DOCUMENTS

| | | | |
|---|---|---|---|
| 4,350,567 | 9/1982 | Moorehead et al. | 264/82 X |
| 4,362,670 | 12/1982 | Malinowski | 264/82 |
| 4,427,610 | 1/1984 | Murray | 264/82 |
| 4,436,498 | 3/1984 | Murray | 264/82 X |
| 4,746,481 | 5/1988 | Schmidt | 264/82 |
| 4,772,439 | 9/1988 | Trevino-Gonzalez | 264/40.6 |
| 5,051,217 | 9/1991 | Alpar et al. | 264/40.1 |
| 5,246,641 | 9/1993 | Perkins et al. | 264/35 |
| 5,443,377 | 8/1995 | Perkins et al. | 425/11 |

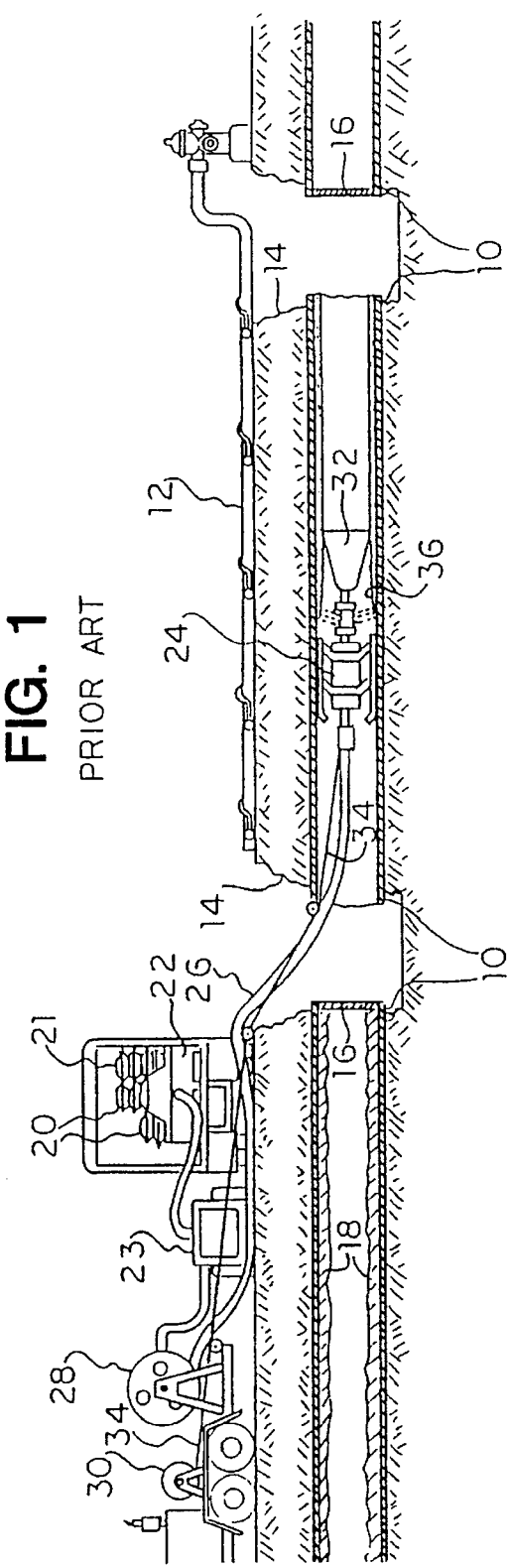
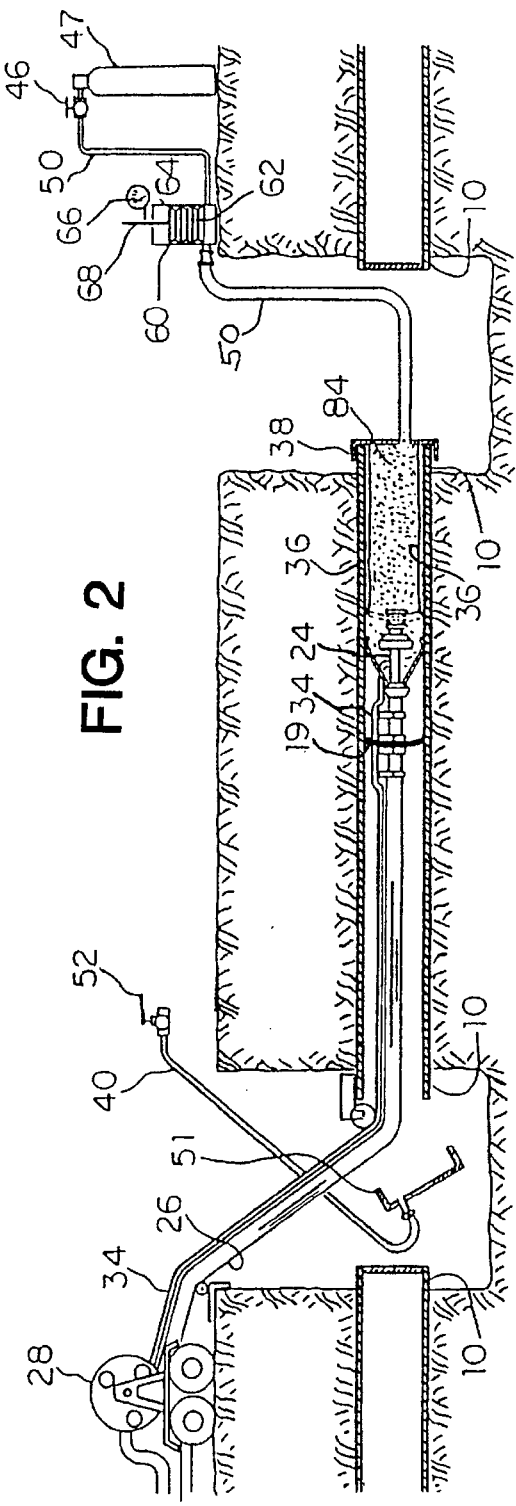

5,650,103

INCREASED EFFICIENCY METHOD FOR LINING A PIPE WITH A CEMENT MORTAR

This application is a divisional of application No. Ser. No. 08/122,997, filed Sep. 17, 1993 (now U.S. Pat. No. 5,443,377), which is a continuation in part of application Ser. No. 07/792,138, filed Nov. 13, 1991 (now U.S. Pat. No. 5,246,641), the disclosure of which is incorporated herein by reference.

TECHNICAL FIELD

The present invention relates to an increased efficiency method and apparatus for lining a section of pipe with a cement mortar.

BACKGROUND OF THE INVENTION

A significant proportion of the water systems supplying potable water in the major U.S. municipalities were built between 1850 and 1950. The subsurface water mains which convey the water from its source to the consumer were made almost exclusively of ferrous metals such as steel and cast iron. With rare exceptions these pipelines were placed in service with little or no protection against internal corrosion. The rare exceptions included the early use of Portland or natural cement mortar to line the inside of certain water mains before they were placed underground. Subsequent experience has demonstrated that such cement mortar linings were by far the most effective means of permanently protecting water mains against internal corrosion.

Among the serious problems caused by internal corrosion are a reduction in carrying capacity, perhaps as high as 50 to 75 percent of the potential capacity, and rusty (red) water being carried to consumers' taps. The reduction in capacity is the result of the growth of barnacle-like nodules known as tubercules on the inside wall of the pipe. The tubercules cause turbulence which, in combination with the reduced cross-sectional area of the pipe, reduces the hydraulic carrying capacity of the water mains. Cleaning the mains will return the capacity to its original value temporarily, but it will return to the reduced value in a very short time. The rusty or red water is the result of corrosion products being carried in the water stream.

While some individual pipe lengths have been factory cement mortar lined since the mid-1800's, the general use of cement mortar lining was not firmly established until about 1945. Today nearly all cast or ductile iron pipe is cement mortar lined at the factory as a part of the manufacturing procedure.

During that period when water mains were being installed before the recognition of the importance of cement mortar lining, many miles of pipe were installed. Repeat cleaning was about the only means of maintaining water system capacity.

In the mid-1930's Albert G. Perkins developed a process for cement mortar lining pipelines in place. Several patents in the 1930's and early 1940's were granted as a result of the development of the lining process, examples being U.S. Pat. Nos. 1,988,329 and 2,168,917. As shown in both of these patents, a wet cement mortar is thrown centrifugally from a rotating distributor head out against the inner surface of the pipe. When properly applied, the mortar will adhere to the pipe surface until it hardens whereupon it forms a unitary self-supporting structure within the pipe. The Perkins patents also show rotating trowels mounted behind the distributor head to smooth the lining material before it hardens. Additionally, U.S. Pat. No. 1,988,329 shows a rotating spray head through which asphaltum curing control liquid is pressure sprayed onto the freshly trowelled lining. U.S. Pat. No. 2,168,917 shows an alternative means for applying a curing control liquid, namely a second electrically driven centrifugal distributor head. The application of the process shown in the foregoing patents was limited to pipelines which were sufficiently large in diameter to permit manual operation of the machines within a pipeline. The minimum diameter which could be lined was about 24 inches.

In the early 1950's a process was developed which permitted the lining of mains of less than 24 inches in diameter, too small for a man to enter. U.S. Pat. No. 2,704,873 was granted to K. K. Kirwan and Alfred G. Perkins, one of the applicants of the present application, on this process.

Since that time the process has been refined and additional patents have been granted, for example, U.S. Pat. Nos. 2,758,352; 3,044,136; 4,067,680; and 4,252,763. Today pipelines as small as four inches in diameter are lined in place.

A conventional water main is indicated generally at 10 in the drawings. As is well known in the art, if the water main is of a ferrous material and has not been coated prior to being placed into service, it will eventually become corroded and tuberculated. Thus, tubercules will gradually form on the interior wall of unprotected metallic water lines to reduce the hydraulic carrying capacity of a water transmission and distribution system. Such water lines can be restored to "new pipe" hydraulic carrying capacity by cleaning and cement lining. In practicing the prior art, temporary distribution lines 12 are installed aboveground to maintain water service to residential and commercial customers. Access to the water main or pipe 10 requires excavation and removal of sections of the pipe, typically 5 feet long. The distance between access points 14 varies greatly in different water main layouts. Typically, they would be several hundred feet apart, the normal distances between 400 to 800 feet. Sections of pipe which are not being cleaned and lined are closed off by existing line valves (if available) or alternatively by temporary plugs 16. The section of pipe which is to be lined then has the tuberculation 18 removed by passing a pipe cleaner assembly (not shown) through the pipeline until all of the tubercular deposits have been removed. The cleaner is either mechanically winched through the pipe section or is propelled by water flow. Water passes through the cleaner to flush solid debris ahead of the unit. The cleaning process may also include pulling a tight fitting circular squeegee or rubber swab (similar to squeegee 19 in FIG. 2) through the section of pipe to remove standing water and remaining loose solids. They may be pulled through the pipe separately, and they may be pulled through the pipe immediately before the lining machine. In any event, the essentially bare pipe is then ready for cement mortar application.

In the prior art illustrated in FIG. 1 a relatively small diameter pipeline is shown, that is, one having a diameter of less than 24 inches. In pipes having a larger diameter, access is typically through excavated points, and manually operated equipment is used within the water main, such equipment being illustrated in U.S. Pat. Nos. 1,988,329 and 2,168,917. For cleaning relatively small diameter pipe, a remotely controlled pipe-lining apparatus such as the type shown in U.S. Pat. No. 2,704,873 is utilized. In this form of apparatus dry mortar formed of Portland cement 20 and sand 21 is mixed with water in a mixer 22 to strict specifications and is then pumped by a pump 23 to a lining machine 24 through a hose 26 mounted upon a hose reel 28. The lining machine, which is also referred to as a centrifugal applicator, is positioned at the end of the section of the pipe remote from the winch 30 prior to being winched through the pipeline. The centrifugal applicator may be followed by a flexible cone-shaped drag trowel 32, such as that shown in U.S. Pat. No. 4,184,830. The apparatus is then winched through the line 10 by operation of the winch 30 and winch line 34, the apparatus throwing a wet cement mortar 36 onto the cleaned surface of the water main 10. The foregoing method and apparatus is well known in the art.

In the application of the lining processes referred to, it has been necessary to interrupt individual consumer services as a result of the removal of a pipeline from services. Standard practice has been to provide aboveground temporary piping 12. This has resulted in direct and indirect expenses and delays which are reflected in substantially higher prices than might otherwise be justified.

A properly applied lining may last perhaps 100 years, while an unlined pipeline must be cleaned perhaps every six months. In order to avoid the cost of cement mortar lining in place and to reduce the out-of-service time, many utilities are nevertheless continuing the practice of repeat cleaning because initial cost is less and because its speed of completion allows for a tolerable interruption of customer service so that temporary aboveground service piping is not required. While this procedure is initially cost and time effective, when one considers that it must be repeated again and again, it loses its cost and time effectiveness. In order that the interruption of service during lining may be tolerable, it is desirable to be able to re-introduce water into a water main within about two hours of cement mortar lining so that the rehabilitation of a length of main may be completed within a working day. This can be done if the cement mortar can be provided with a crust which is hardened sufficiently in 1 hour after lining to receive water without erosion damage.

Various proposals have been made for reducing the out-of-service time when a cement lining is applied. Seal coats, such as disclosed in U.S. Pat. No. 4,252,763, have been used in factory cement mortar-lined cast and ductile iron pipes for retaining residual moisture for curing and for helping prevent excessive cracking due to moisture loss. They also help to conceal imperfections and cracks in the cement mortar lining. The seal coats present barriers between the mortar and water carried in the pipe to retard the rate at which soluble elements (primarily calcium hydroxide), which may adversely affect water quality by imparting a high alkalinity (high pH) to the water for the first few weeks after a new cement mortar lining is placed in service, are dissolved from the surface of a new lining. However, such seal coats do not affect the chemistry of hydration of the cement in the mortar and therefore do not accelerate its set time.

As pointed out in U.S. Pat. No. 4,252,763, the application of an asphaltum curing control liquid, as in earlier patents such as U.S. Pat. Nos. 1,988,329 and 2,168,917, was not satisfactory because the freshly applied wet mortar does not strongly adhere to the pipe surface, and, if the lining is disturbed to any substantial extent before it has taken its initial set and has begun to acquire structural strength of its own, it is likely to result in progressive erosion wherein the entire mortar lining pulls away and falls to the bottom of the pipe. In order to overcome these problems, U.S. Pat. No. 4,252,763 proposed to atomize the liquid so that a fine mist of the "curing compound" was applied to the surface of the wet mortar. It is difficult to effect adherence of this seal coat to a fresh lining since it tends to flake off into the water. Moreover, it does not accelerate its set time or provide resistance to scouring by early introduction of flowing water.

Another proposal which has been suggested is to use accelerators within the mortar mix. The use of accelerators has its limitations because of the complexity of the lining procedure which, after the mixing of all the ingredients of the mortar in a mixer, requires the mixture to be kept a certain amount of time in a pump hopper. The cement mortar is then pumped through a hose, which is typically 1 to 2 inches in diameter, for distances of from 400 to 800 feet to a centrifugal machine operated well beyond reach inside the water main. The potential for disaster in the event of unforeseen delays or of unpredictable set time would make even the conservative use of accelerators risky. These accelerators are subject to wide variations in time required for set and are therefore not dependable in field circumstances where wide temperature and material variations are probable. Second, even though the mortar quickly attains initial set through the use of accelerators, it is still vulnerable to surface scouring by a flow of water until it becomes harder. This would require an unacceptable delay in returning a water main to service.

In addition to the above problems of achieving a rapid set time so that out-of-service time can be reduced, there remains the problem of the previously discussed release of high pH constituents into the water of a water main when it is first returned to service thereby reducing water quality.

U.S. Pat. No. 2,917,778 to Lyon Jr. et al, 4,362,679 to Malinowski, 4,093,690 to Murray, and 4,746,481 to Schmidt disclose processes for curing various manufactured articles or, in the case of the casting process of Malinowski, floors, walls, and the like on a building site, by the use of carbon dioxide in molds, presses, and the like. The Lyon Jr. et al process involves the closed vessel curing of concrete lined vessels such as water heater shells, and the patent states, at Col. 2, lines 25 to 28, that it is sufficient that the carbon dioxide in the tank be enough to neutralize the layer of calcium hydroxide which is on the surface of the concrete. The time period discussed is undesirably on the order of several days (in Example I, it was 28 days).

While Malinowski, Murray, and Schmidt discuss short curing times ("5 to 30 minutes" in the Schmidt press, and "a few minutes" in the Murray chamber), they do not teach or suggest stopping a reaction of carbon dioxide with deposited cement mortar before a crust of calcium carbonate has been formed through the entire thickness of the cement mortar deposit, and such a crust has a low pH.

Other patents which may be of interest include Japanese patent document 114,823, and U.S. Pat. Nos. 825,088; 898,703; 1,932,150; 2,363,226; 3,249,665; 3,358,342; 4,252,763; 4,350,567; 4,427,610; 4,436,498; 4,772,439; and 5,051,217.

By providing a crust of calcium carbonate, high pH constituents may be prevented from release into the water so that the water quality is not reduced, as previously discussed. However, in using carbon dioxide gas to form the crust, it is important that the water main be returned to service quickly and that the layer of mortar adjacent the pipe maintain a high pH for corrosion-resistance at the pipe interface. It is also desirable that the crust be formed dependably and efficiently.

OBJECTS AND SUMMARY OF THE INVENTION

It is accordingly an object of the present invention to provide a dependable and efficient method and apparatus for lining water mains wherein service may be more quickly restored and wherein direct and indirect expenses associated with delays and the requirement for attendant aboveground temporary piping may be reduced.

It is another object of the present invention to maintain a high pH in the layer of mortar adjacent the pipe for corrosion-resistance at the pipe interface.

It is yet another object of the present invention to prevent or reduce the release of high pH constituents into the water of the lined water main when it is first returned to service.

In order to efficiently line a water main with a minimum of out-of-service time, in accordance with the present invention the fresh mortar lining is exposed to a minimum positive pressure of carbon dioxide gas for a period of time which allows it to combine chemically with calcium compounds of the wet cement mortar to form a crust of calcium carbonate which will tolerate a low-velocity flow of water and protect the underlying mortar from scouring until the normal hardening of the mortar through hydration of the cement can take place.

The foregoing and other objects, features, and advantages of the present invention will be more fully understood after a consideration of the following detailed description taken in conjunction with the accompanying drawings wherein the same reference numerals denote the same or similar parts throughout the several views and in which a preferred embodiment of the present invention is illustrated.

BRIEF DESCRIPTION OF THE DRAWINGS

FIG. 1 is a generally diagrammatic view of a method of lining a section of pipe in accordance with the prior art.

FIG. 2 is a generally diagrammatic view illustrating the lining of a section of pipe in accordance with the present invention.

DETAILED DESCRIPTION

Figure 3:
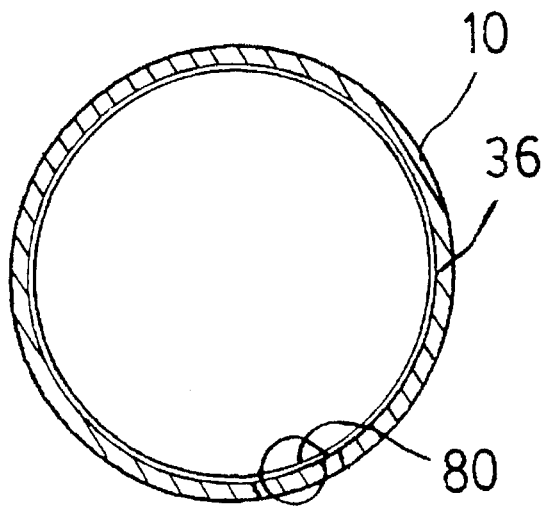
FIG. 3 is a sectional view of the section of pipe of FIG. 2 after lining thereof and in condition for water flow therethrough.

Referring to FIG. 2, there is illustrated a method, in accordance with the present invention, of lining a section of water main 10 by delivering wet mortar from a mixer, which may be similar to mixer 23, to lining apparatus 24, and throwing the wet cement mortar 36 onto the cleaned surface of the water main 10, similarly as described for the method illustrated in FIG. 1. Squeegee or rubber swab 19 is also pulled through the pipe section to complete the cleaning process before application of the mortar. The apparatus 24 is winched through the line 10 by operation of a winch, similar to winch 30, with winch line 34. For reduced cost, the trowel, illustrated at 32 in FIG. 1, may, if desired, be eliminated, as indicated by its absence in FIG. 2.

As previously indicated, the prior art illustrated in FIG. 1 disadvantageously requires that residential and commercial business lines be provided by temporary service connections since the water main to be lined will be out-of-service for typically several days during the lining and subsequent hardening of the wet cement mortar by normal hydration. A conventionally applied lining will normally develop a calcium carbonate layer from interaction with carbon dioxide in the water over a long period of perhaps 5 to 10 years. This layer is naturally retarded from extending through the entire thickness so that the layer remains relatively thin.

Figure 4:
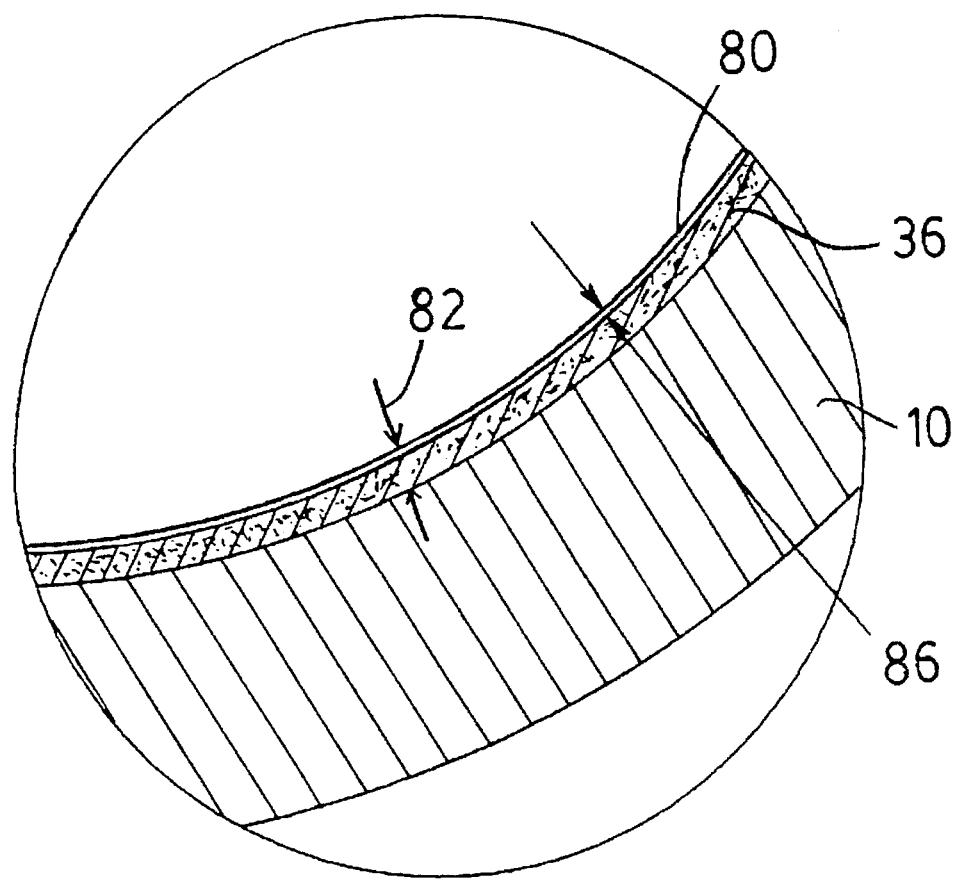
FIG. 4 is an enlarged view similar to that of FIG. 3 of the portion of the section of pipe circled in FIG. 3.

In accordance with the present invention, a calcium carbonate crust is formed quickly by the use of carbon dioxide gas in order that the water main pipe may be put back in service quickly. Thus, as illustrated in FIGS. 2 to 4, in accordance with the present invention a relatively high concentration of carbon dioxide gas, illustrated at 84, from pressurized tank 47 is introduced into the freshly lined water main in sufficient quantities to form a crust, illustrated at 80, of calcium carbonate on the interior surface of the wet cement mortar, illustrated at 36, sufficiently quickly and to sufficient depth as to reduce the out-of-service time of the water main to an acceptable level, i.e., perhaps only for 7 hours or less. This will reduce the delay in restoring service as well as the costs associated with providing temporary service connections. The carbon dioxide gas tank 47 has a suitable valve 46 connected to its outlet for controlling the flow of carbon dioxide gas 84 from tank 47 to the interior of the pipe section 10 being lined.

In accordance with the present invention, an airtight bulkhead or cap 38 is mounted to an end (farthest from the winch) of the section of the pipe which is being provided with a wet cement mortar 36. The cap 38 has an opening to which is connected one end of a portion of feed hose 50 the other end of which is connected to bellows 60. The purpose of the bellows will be described later. Another portion of the feed hose 50 is suitably connected to and extends between bellows 60 and the control valve 46. The portion of hose 50 between the cap 38 and bellows 60 is preferably of sufficiently large diameter, perhaps 1 to 1½ inch, to prevent flow rate reduction due to freezing associated with expansion of the compressed carbon dioxide gas from high pressure to atmospheric pressure. Thus, carbon dioxide gas is suitably released from tank 47 into the water main section interior to react with the mortar, as previously discussed.

The tight fitting rubber swab 19 is provided on lining machine 24 not only as a means for removal of standing water before mortar application but also to displace air as the lining machine is pulled through the pipe section during the lining operation and to draw in carbon dioxide gas 84 from tank 47.

In accordance with alternative embodiments of the present invention, a trowel, similar to trowel 32 of FIG. 1, or other suitable means may be placed either ahead of the pipe lining machine instead of the swab 19 or after the pipe lining machine to perform the functions the swab would perform including air displacement.

After completion of lining and removal of the lining machine 24, the other end of the pipe section is preferably capped by airtight bulkhead 51 which has an opening to which is suitably connected a small diameter hose 40 the end of which is closed by a suitable control valve 52.

Since carbon dioxide gas is heavier than air, tank 47, valve 52, and bellows 60 are preferably positioned at ground level or otherwise well above the pipe 10.

The calcium carbonate layer which is formed by the process of the present invention would naturally be formed anyway to a certain depth over a period of time. However, the crust formed by the application of the carbon dioxide gas is not retarded from extending through the entire lining thickness in the same way that the naturally formed layer is retarded. Thus, the carbon dioxide gas 84, over a period of perhaps 2 or 3 days, may penetrate all the way through the lining thickness so that the crust would extend through the entire lining thickness.

Carbon dioxide lowers the mortar pH so that the crust is more acidic and therefore less effective for inhibiting corrosion. It is thus important that the layer of mortar adjacent the pipe not be converted to calcium carbonate.

By returning the water main section to service within about 7 hours thereby displacing the carbon dioxide gas in the section, the reaction is ceased so that the mortar pH at the pipe interface remains desirably high. Thus, by controlled use of a reaction which naturally occurs over a period of time anyway, the water main can be put back in service quickly for the convenience of the customers while maintaining corrosion-resistance at the pipe interface. This crust 80 should not lessen the value of the lining because the formation of a calcium carbonate layer would naturally occur anyway.

In order to effect formation of the crust, a positive carbon dioxide gas pressure, i.e., a pressure higher than atmospheric pressure, is desired to maintain saturation. However, pressures higher than required to maintain a saturated condition may not provide additional benefit in crust formation. Moreover, excess carbon dioxide gas constitutes a waste which not only increases costs but also may undesirably be released to the atmosphere. Further, excess pressure may damage the swab and may result in freezing associated with expansion of the compressed carbon dioxide gas. Thus, in accordance with the present invention, a pressure within the water main section which is only slightly higher than atmospheric pressure, i.e., a minimum positive pressure, is maintained to effectively and quickly form the crust 80 with a minimum of waste of carbon dioxide gas 84. As the air is displaced from the pipeline 10, it is only necessary that a vacuum be prevented to insure filling of the pipeline with the carbon dioxide gas 84. Too great of pressure, in addition to wasting carbon dioxide gas, may also exert an undesirably high force on the swab 19. Thus, the desired carbon dioxide pressure is greater than atmospheric pressure but not over about 1 psig (pounds per square inch gage), more preferably, not over about 0.1 psig. For example, a pressure of about 0.01 psig is considered desirable. Conventional pressure gages may not have the capability of measuring such low pressures to indicate such low positive pressures with sufficient precision. As used herein and in the claims, the term "minimum positive pressure" is meant to refer to a pressure greater than atmospheric pressure and less than about 1 psig.

In order to precisely regulate the carbon dioxide gas pressure within the water main section to maintain the desired positive pressure, the bellows, illustrated at 60, or other suitable means for providing a measurement of pressure in the 0 to 1 psig range is provided in the gas inlet line 50. The bellows may be characterized as a thin accordion-shaped membrane 62, within a suitable container 64, which membrane unfolds and thus expands by a large amount with small increases in pressure and contracts by a large amount with small decreases in pressure, the pressure within the line 50 and accordingly within the water main section being supplied to the interior of the bellows membrane 62 in accordance with principles commonly known to those of ordinary skill in the art to which this invention pertains. An example of a suitable bellows is an ATL flexible bladder marketed by Aero Tec Laboratories Inc. of Ramsey, N.J. The bellows 60 may suitably have an indicator rod 68 and a pointer 66 which is suitably connected thereto and which is calibrated relative to bellows expansion and contraction to provide a precise indication of slight positive pressure. The bellows 60 may be said to be a variable volume enclosure in pressure communication with the interior of the pipe line. Thus, the bellows 60 may be said to measure excess volume for the available carbon dioxide gas 84 within the changing volume within the pipeline 10 and line 50 at any given time as the pipe-lining machine 24 is moved through the pipeline. An excess volume measurement is an indicator of positive pressure which may be quantified by pointer 66. The continuous positive pressure obtainable by use of the bellows and the sealing provided by the swab are thusly provided to achieve a concentration of 100% carbon dioxide continuously as the volume is changing due to movement of the swab.

A preferred process for lining a section of water main 10 is as follows. Begin lining with swab 19 just ahead of lining machine 24 and with the machine 24 applying a suitable cement mortar coating 36 to the interior surface of the pipe 10. The machine 24 is withdrawn at a rate that is calculated to deposit a lining of a thickness which preferably is kept to a minimum consistent with providing a sufficient thickness. The thickness is minimized so that the time of application may be reduced and the thickness of compressible uncured mortar under the hard crust will be small to help minimize damage. A mortar thickness, illustrated at 82, of, for example, about 0.1 inch (2.5 mm) is considered to be satisfactory.

As soon as the lining machine 24 has fully entered the pipe 10, the bulkhead 38 is securely attached to the pipe end. Valve 46 is opened and suitably adjusted to provide a flow of carbon dioxide gas 84 into the pipe interior at a suitable rate of perhaps about 11 cubic feet per minute to provide a minimum positive carbon dioxide pressure of perhaps about 0.01 psig. The flow rate of carbon dioxide gas 84 is suitably adjusted such as by valve 46 to maintain the desired pressure as lining machine 24 recedes. The pressure is indicated by pointer 66 of bellows 60. If desired, the valve 46 may be suitably connected to bellows 60 for automatic control of the pressure.

The machine 24 is receded at a suitable rate such that, for example, it will emerge from the other end of a 150 meter long section of pipe approximately 17 minutes later. The bulkhead 51 is then immediately fixed to the end of the pipe section from which machine 24 is withdrawn. The valve 52 may be opened briefly to vent any air from the pipeline, then closed and valve 46 used to maintain the desired positive pressure until the crust forms. If desired or needed, a carbon dioxide detector may be provided to determine that the pipeline is suitably vented. If it is desired or necessary to insure a slight positive pressure throughout the water main section length, another bellows, similar to bellows 60, may be provided in outlet line 40.

As carbon dioxide gas is consumed in forming the crust, more must be added to maintain saturation. Thus, a very small flow rate may be maintained. The carbon dioxide gas at a slight positive pressure is then allowed to react with the cement mortar 36 for a suitable period of perhaps 1 hour perhaps while the other lining equipment is cleaned.

After the period of reaction time, the valve 46 is closed, the bulkheads 38 and 51 are removed, and the pipe spools are re-installed to complete the pipe 10. Mainline valves may then be opened slightly to allow water to flow slowly into the newly lined pipe 10, which may thereafter be restored to service after suitable disinfection, thereby displacing the carbon dioxide gas in the section of pipe to stop the reaction of the carbon dioxide with the deposited cement mortar before the crust 80 of calcium carbonate has been formed through the entire thickness of the cement mortar deposit.

The above process is provided so that a sufficiently hard crust 80 may be formed quickly, perhaps in about 1 hour, on the lining after placing so that the pipeline may receive water without erosion damage until normal hardening of the mortar through hydration of the cement can take place. The carbon dioxide gas 84 combines chemically with the cement close to the surface of the mortar to produce calcium carbonate, which forms the protective crust to a depth, illustrated at 86, of perhaps about 0.4 mm over the soft mortar. This allows the pipe to accept the introduction of water without damage and without the undesirable release of high pH constituents into the water while the underlying soft mortar continues to harden normally. This allows the re-introduction of water into a water main within perhaps 2 hours of lining thereof so that rehabilitation of the length of main may be completed within a working day. Yet the value of the lining is not lessened since a calcium carbonate layer would naturally form anyway. Thus, the out-of-service time may be substantially reduced to perhaps 7 hours or less for a more acceptable disruption of service to customers, and the added expense of providing temporary water service lines may be eliminated.

While a preferred lining process is described above, it should be understood that other suitable lining processes may be employed to react the carbon dioxide gas with the mortar. For example, the mortar may be applied to an entire section which is then inspected to insure that it is suitably placed before the introduction of carbon dioxide gas. As the carbon dioxide gas 84 is introduced, the valve 52 is opened to vent the air from the pipeline (or the pipeline otherwise suitably vented), and a suitable carbon dioxide detector (which may measure lack of oxygen) used to indicate that the air in the pipeline has been displaced by carbon dioxide gas. The valve 52 may then be closed and the valve 46 adjusted, as previously discussed, to maintain slight positive pressure for formation of the crust. Such other processes are meant to come within the scope of the present invention.

For purposes of illustration and not for limitation, the following exemplary calculation is provided. Type II Portland cement is used, in accordance with the example, for the cement mortar lining because its slower setting time allows it to be conveyed and applied with greater safety. This cement is composed of, by weight, 42 percent $3CaO.SiO_2$, 33 percent $2CaO.SiO_2$, 5 percent $3CaO.Al_2O_3$, and 13 percent $4CaO.Al_2O_3.Fe_2O_3$. As water is added to the cement, calcium hydroxide is immediately formed, the excess water continuing to hydrate the cement over a long period. The pipe section to be lined has an inner diameter of 200 mm and a length of 150 meters providing a surface area to be lined of about 94.25 square meters. For a typical crust thickness of 0.4 mm, the volume of crust is calculated to be about 0.0377 cubic meters. It is known that the density of the cement mortar, which has 1 part sand to 1 part cement to 0.4 part water, is about 2200 kg per cubic meter. From this the weight of the cement in the crust is calculated to be about 34.6 kg. When water is added to the cement, the total weight of calcium hydroxide formed is calculated to be about 14.4 kg. The calcium hydroxide combines with the carbon dioxide gas according to the equation:

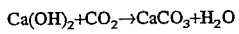

$$Ca(OH)_2 + CO_2 \rightarrow CaCO_3 + H_2O$$

The molecular weights of calcium hydroxide and carbon dioxide are 38 and 28 respectively providing a weight ratio of carbon dioxide to calcium hydroxide of 28/38 or 0.74. Therefore, the weight of carbon dioxide gas required to produce the hardened crust 0.4 mm thick on 150 meters of 200 mm inner diameter pipe is 0.74×14.4 kg or 10.6 kg (23.3 lbs.). The weight of carbon dioxide gas at standard temperature and pressure that is required to fill the pipe section is 27.7 kg. (61 lbs.) which is greater than the amount required for the reaction. Thus, the maintenance of a slight positive pressure of perhaps 0.01 psig should insure more than enough carbon dioxide gas to complete the chemical reaction, which may take perhaps 1 hour to reach the desired depth after which water flow is reestablished to displace the carbon dioxide gas so as to stop the reaction at the desired crust depth. The carbon dioxide gas pressure, as indicated by bellows 60, is adjusted by manipulating valve It is to be understood that the present, invention is by no means limited to the specific embodiments which have been illustrated and described herein and that various modifications thereof may indeed be made which come within the scope of the present invention as defined in the appended claims.

What is claimed is:

1. A method of lining a section of water main pipe having an interior surface comprising taking the water main pipe section out-of-service, depositing a cement mortar on the interior surface to form a lining, forming on an interior surface of the lining of cement mortar a crust of calcium carbonate to a thickness which is less than an entire thickness of the cement mortar lining such that some cement mortar underlies the crust for protection by the crust of calcium carbonate of the underlying cement mortar from scouring as water is introduced into the section of pipe until hardening of the underlying cement mortar through hydration of the cement mortar takes place, the step of forming the crust of calcium carbonate comprising introducing carbon dioxide gas into the section of pipe to react with the deposited cement mortar until the crust of calcium carbonate is formed, regulating the introduction of the carbon dioxide gas to maintain a minimum positive pressure of the carbon dioxide gas within the water main pipe section, and returning the water main pipe section to service thereby displacing carbon dioxide gas in the section of pipe to stop the reaction of carbon dioxide gas with the deposited cement mortar before the crust of calcium carbonate has been formed through the entire thickness of the cement mortar lining.

2. A method according to claim 1 further comprising regulating the introduction of carbon dioxide gas so that the minimum positive pressure of carbon dioxide gas within the section of pipe is less than about 0.1 psig.

3. A method according to claim 1 further comprising providing a bellows for indicating the positive pressure of the carbon dioxide gas within the section of pipe.

4. A method according to claim 1 further comprising returning the water main pipe section to service within about 7 hours after the pipe section is taken out of service.

5. A method according to claim 1 further comprising regulating the introduction of carbon dioxide gas so that the minimum positive pressure of carbon dioxide gas within the section of pipe is equal to about 0.01 psig.

6. A method according to claim 1 further comprising sealing a first end of the water main pipe section, introducing the carbon dioxide gas at the sealed first end of the water main pipe section, drawing a pipe lining machine through the water main pipe section away from the first end while depositing the cement mortar, providing on the pipe lining machine a seal for sealing the water main pipe section as the pipe lining machine is drawn therethrough, and introducing the carbon dioxide gas as the pipe lining machine is drawn through the water main pipe section.

7. A method according to claim 6 further comprising removing the pipe lining machine from a second end of the water main pipe section after the cement mortar has been deposited, sealing the second end of the water main pipe section after the pipe lining machine has been removed therefrom, and regulating the introduction of carbon dioxide gas to maintain the minimum positive pressure thereof in the water main pipe. section until the crust of calcium carbonate is formed.

* * * * *